US010855838B2

(12) United States Patent
Byrne et al.

(10) Patent No.: US 10,855,838 B2
(45) Date of Patent: *Dec. 1, 2020

(54) SYSTEMS AND METHODS FOR BLOCKCHAIN WIRELESS SERVICES IN A CONTROLLED ENVIRONMENT

(71) Applicants: Michael Francis Byrne, Irving, TX (US); Brian Francis Byrne, Irving, TX (US)

(72) Inventors: Michael Francis Byrne, Irving, TX (US); Brian Francis Byrne, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,391

(22) Filed: May 14, 2020

(65) Prior Publication Data
US 2020/0274967 A1    Aug. 27, 2020

Related U.S. Application Data

(63) Continuation of application No. 16/517,620, filed on Jul. 21, 2019.

(60) Provisional application No. 62/714,737, filed on Aug. 5, 2018.

(51) Int. Cl.
*H04M 3/42* (2006.01)
*H04M 3/22* (2006.01)
*G06F 16/182* (2019.01)
*G06Q 20/38* (2012.01)
*H04W 84/18* (2009.01)

(52) U.S. Cl.
CPC .... *H04M 3/42221* (2013.01); *G06F 16/1824* (2019.01); *G06Q 20/382* (2013.01); *H04M 3/2281* (2013.01); *H04W 84/18* (2013.01)

(58) Field of Classification Search
None
See application file for complete search history.

(56) References Cited

U.S. PATENT DOCUMENTS 5,485,507 A    1/1996 Brown
8,121,264 B1 *  2/2012 Hogg, Jr. .......... H04M 3/42221
                                                         370/260

(Continued)

OTHER PUBLICATIONS

Cellblocks, Creating an Economy for Inmates Within the Prison System, Whitepaper, Jan. 27, 2018, 38 pages, United States.

*Primary Examiner* — Harry S Hong

(57) ABSTRACT

A method of providing blockchain wireless services in a controlled environment is provided. The method comprises a wireless communication device associated with an inmate of a controlled environment receiving one of a voice and video call from a device external to the controlled environment. The method further comprises the device placing the received call into a hold state and sending a request for validation of the call via a blockchain, the request identifying at least parties to the call. The method further comprises the device, upon receipt of validation, removing the call from the hold state; and enabling at least one of voice and video functionality for the parties. The method further comprises the wireless communication device sending the request for validation to a telecommunications server and the server conducting real time monitoring of the call. The method further comprises the device continuously recording the call.

27 Claims, 1 Drawing Sheet

(56) References Cited

U.S. PATENT DOCUMENTS

| | | | |
|---|---|---|---|
| 9,014,661 B2* | 4/2015 | deCharms | H04W 4/021 |
| | | | 455/404.2 |
| 9,965,746 B1 | 5/2018 | Keiser | |
| 10,313,510 B2* | 6/2019 | Chang | H04M 3/2281 |
| 10,607,307 B1 | 3/2020 | Pickens | |
| 10,636,067 B2 | 4/2020 | Collins | |
| 10,694,032 B2* | 6/2020 | Byrne | G06Q 20/382 |
| 2017/0031874 A1* | 2/2017 | Boudville | H04L 9/3239 |
| 2017/0132615 A1* | 5/2017 | Castinado | G06F 16/2255 |
| 2018/0048738 A1* | 2/2018 | Hinds | H04W 80/04 |
| 2018/0109541 A1* | 4/2018 | Gleichauf | H04L 67/1097 |
| 2019/0044703 A1* | 2/2019 | Smith | G06K 9/00624 |
| 2019/0172023 A1* | 6/2019 | Brandborg | G06Q 20/065 |
| 2019/0325420 A1* | 10/2019 | Gardner | G06Q 20/32 |
| 2019/0394637 A1* | 12/2019 | Viswanathan | H04M 15/50 |
| 2019/0394648 A1* | 12/2019 | Tipton | H04W 12/08 |
| 2020/0045167 A1* | 2/2020 | Byrne | G06F 16/1824 |

* cited by examiner

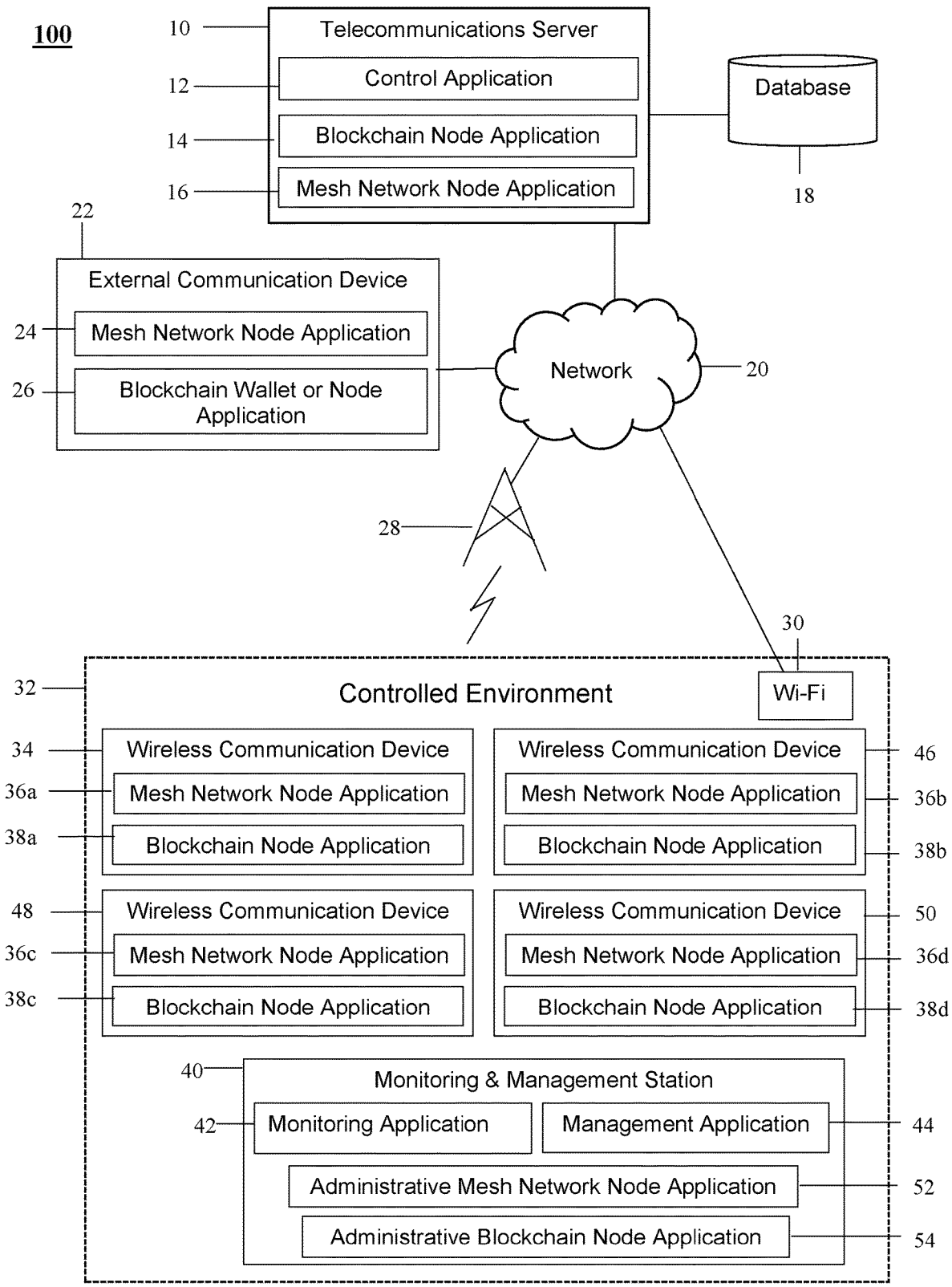

SYSTEMS AND METHODS FOR BLOCKCHAIN WIRELESS SERVICES IN A CONTROLLED ENVIRONMENT

CROSS-REFERENCE TO RELATED APPLICATIONS

This application is a continuation of U.S. patent application Ser. No. 16/517,620, filed Jul. 21, 2019, which claims the benefit of U.S. provisional application 62/714,737 filed Aug. 5, 2018, each of which is incorporated by reference herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present disclosure is in the technical field of telecommunications services. More particularly, the present disclosure is in the technical field of wireless telecommunications services provided in controlled environments.

SUMMARY OF THE INVENTION

The present invention is a controlled environment wireless system and provides systems and methods of utilizing a blockchain network for providing, managing and administering a controlled environment wireless system.

BACKGROUND

Telecommunications services for inmates and other detainees in prisons and other controlled environments is a controversial and important subject. Inmates have a right and deserve to regularly communicate with at least family members and providers of legal services. Wardens and other supervisors of controlled environments must provide such services but are responsible for security of inmates and employees. Wireless devices in controlled environments present particular challenges as they are small and can therefore be concealed and moved about easily.

In traditional telecommunications systems of controlled environments, the administrative costs involved in recording and maintaining data associated with inmate phone use are limited by the number of phone kiosks in the controlled environment. This number is typically small and therefore makes it reasonable to maintain such administration via a single conventional, centralized computing center, whether located on site in the correctional facility or in a remote site. However, as the number of these telecommunication devices and the complexity of the system increases with the introduction of mobile devices to prisoners, inmates, arrestees, residents or other detainees in controlled environments, the amount of cost and complexity involved in maintaining the records and monitoring permissions increases significantly.

BRIEF DESCRIPTION OF THE DRAWINGS

FIG. 1 is a block diagram of a system of blockchain wireless services in a controlled environment according to an embodiment of the present disclosure.

DETAILED DESCRIPTION OF THE INVENTION

Systems and methods described herein provide for a wireless communication device in possession of a detainee confined to a controlled environment to securely place and receive wireless voice and data transmissions to and from parties outside the environment via use of blockchain technology. A call, whether incoming or outgoing, includes information associated with a transaction to be stored in a blockchain. The blockchain is updated by disseminating the transaction information through a multipath wireless mesh network to other wireless devices in possession of fellow inmates. Prison management and others also receive the transaction information.

The wireless device in possession of the detainee acts as a blockchain node. The device further acts as a network node in a wireless mesh network or multipath wireless mesh network. The mesh networks operate on one or more of a Wi-Fi network, a radio frequency network, or via use of other mobile ad hoc network-capable technology.

A blockchain is a database that is distributed among multiple computing devices. A blockchain is formed from blocks, with each block having information related to a transaction and linking the block to a prior block in the chain. The devices can each have respective copies of the blockchain, so that no centralized or official copy of the blockchain exists and the devices are trusted equally. When a user engages in a transaction, some or all devices may verify the transaction. After verification, the devices can include information related to the transaction into their respective copies of the blockchain.

Blockchain technology allows a network of computers to agree at regular intervals on the true state of a distributed ledger. The ledger is distributed across many participants in the network. The ledger does not exist in any one place. Instead, copies exist and are simultaneously updated with every fully participating node in the ecosystem.

Blockchain technology use in a multipath wireless network as described herein may distribute requirements of a telecommunication system to many distributed nodes. Blockchain may therefore reduce burden on processing, network and storage systems of a correctional facility. By enabling the mobile devices within a controlled environment as blockchain nodes as well as multipath wireless network nodes, not only can much of the computing power be offloaded from a facility's systems but the facility may safely and securely maintain the same control and oversight as previously available.

Recordkeeping and regulation of inmate device use may be distributed as provided herein, with security and computing power increasing as a system grows. By distributing a blockchain ledger among nodes in a closed system of a controlled environment, not only is the computing power distributed across nodes, but the records of the transactions within a system may also be distributed and replicated. This structure may promote redundancies and failsafe options not previously available.

A distributed blockchain system creates a more permanent and unalterable record than a single database could, while allowing more nodes to function simultaneously. Distributed systems promoted by blockchain technology provide controlled environments the potential to distribute regulation of the system by giving the nodes the ability to regulate themselves anonymously from each other and transparent to those administering a controlled environment. Not only can more devices be supported, but they can be supported with fewer resources and increased security.

Blockchain may also reduce costs of running a secure network which is important in publicly funded institutions such as controlled environments. Because blockchain verifies trustworthiness, a centralized server does not need to handle this task. Friction of transactions is reduced, promoting cost and time savings.

Turning to the FIGURES, FIG. 1 is a block diagram of a system of blockchain wireless services in a controlled environment according to an embodiment of the present disclosure. FIG. 1 depicts components of a system 100 provided herein including a telecommunications server 10, a control application 12, a blockchain node application 14, and a mesh network node application 16.

The system 100 also comprises a database 18, a network 20, an external communication device 22, an external mesh network application 24, and a blockchain wallet or node application 26. The system 100 also comprises a radio frequency network 28, a Wi-Fi network 30, and a controlled environment 32.

The system 100 also comprises wireless communication devices 34, 46, 48, 50. Inmate mesh network node applications 36a-d and blockchain network node applications 38a-d are also provided by the system 100 which are components, respectively, of the wireless communication devices 34, 46, 48, 50. The system 100 further comprises a monitoring and management station 40, a monitoring application 42, a management application 44, an administrative mesh network node application 52, and an administrative blockchain node application 54.

Discussion herein regarding the wireless communication device 34 applies to the wireless communication devices 46, 48, 50 unless otherwise noted. Discussion herein regarding the inmate mesh network node application 36a and blockchain network node application 38a applies to the inmate mesh network node applications 36b-d and blockchain network node applications 38b-d, respectively, unless otherwise noted.

The controlled environment 32 may be a penal facility, correctional facility, rehabilitation center, jail, prison, holding cell, halfway house, or hospital. The controlled environment 32 may be a penitentiary, camp, detention center, or other facility operated by a federal, state, provincial, municipal, military, or other public body or agency. The controlled environment 32 may alternatively be privately operated under contract with a court, correctional agency or other public body. In an embodiment, the controlled environment 32 may be a public hospital or other institution in which non-offending persons reside as wards of a state, province, municipality or other public body.

The wireless communication device 34 is associated with an inmate, detainee or other resident of a controlled environment 32 and originates and receives wireless communications for the inmate. The communications include information associated with transactions to be included in the blockchain. The blockchain is updated by propagating transaction information through one or more of a multi-path wireless mesh network and wireless mesh network to at least other inmate-associated wireless communication devices 46, 48, 50. The wireless communication devices 34, 46, 48, 50 may be mobile phones, cell phones, mobile computing devices, smartphones, desktop computers, laptop computers, tablet computers, custodial telephones, kiosks, or video communication stations.

A wireless system of the controlled environment 32 may be a wireless mesh network or multipath wireless mesh network. The wireless system may operate on at least one Wi-Fi network 30, radio frequency network 28, or other mobile ad hoc network capable technology.

The wireless communication devices 34, 46, 48, 50 may act as wireless mesh network nodes or multipath wireless network nodes using at least the inmate mesh network node applications 36a-d, respectively. The wireless communication devices 34, 46, 48, 50 may act as blockchain nodes using at least the blockchain network node applications 38a-d, respectively.

The monitoring and management station 40 is a collection of processes executing on at least one computer enabling creation, removal, and enforcement of restrictions, verifications, configurations, and authorizations of inmates, visitors, and other persons. Devices may be validated, added, or removed from the multipath wireless mesh network by administrators of the station 40. Transactions may be inspected, analyzed, validated, monitored, and renewed by such administrators.

Administrators include wardens, guards, orderlies, prison staff, jailers, information technology professionals, system administrators, and law enforcement agents. Such administrators may manage various data items associated with inmates which may include altering restrictions applicable to inmates. Such restrictions include device use restrictions, inmate use restrictions, and inmate contact restrictions.

The monitoring application 42 and the management application 44 execute on the station 40. The monitoring application 42 is used by authorized persons to listen to outgoing or incoming detainee calls on a live or recorded basis. These authorized persons may use electronic tools used in various forensic activities. These activities include assisting in the detection of prohibited behavior by detainees, outside parties, and others including penal officers who may be violating or compromising penal facility regulations.

The management application 44 is used by authorized parties to configure the control application 12 and manipulate files stored in the database 18 and elsewhere. In addition to adding, removing and changing detainee calling privileges, schedules and accounts, these actions comprise adding and deleting phone numbers and other contact information details of external devices 22 and associated persons authorized to speak with detainees.

System administrators may use a browser as a "front end" or client software tool provided by the management application 44 to access the control application 12, the database 18 and other components. The management application 44 may provide simplified web forms to add detainees and make other program changes. System administrators may be wardens, senior correction officials, or others that develop and implement policies regarding program administration as a whole.

The station 40 and its components may be located inside, outside or both inside and outside the controlled environment 32. The administrative blockchain node application 52 executes at least partially on the station 40 and provides administrators authority to validate, add, remove the wireless communication device 34 from the blockchain.

The administrative blockchain node 54 allows for truncating and pruning the controlled environment blockchain ledger. The pruned portion is removed from the wireless communication devices 34 and a new controlled environment blockchain ledger is created. The pruned data remains on at least one of the administrative blockchain node 54 and the database 18. All configuration data of the wireless communication devices 34 are then added to the new controlled environment blockchain ledger. Pruning and truncation of the blockchain ledger may take place at scheduled intervals, based on ledger size or other measures, or on an ad hoc basis. The monitoring and management station 40 also functions as an administrative mesh network node application 52.

External communication devices 22, which may, for example, be used by family members or attorneys authorized to contact an inmate, may call the inmate directly on the inmate's wireless device 34. External devices 22 may be wireless telephones, computers, and tablet devices. The external device 22 may interact with the telecommunications server 10 and the control application 12 to establish such contact. While the telecommunications server 10 and its components are illustrated in FIG. 1 as external to the controlled environment 32, in embodiments the telecommunications server 10 may be physically situated inside the controlled environment 32.

The telecommunication server 10 may further act as at least one of a wireless mesh network node and a multipath wireless mesh node 14. The telecommunications server 10 may also function as a blockchain node 16

The telecommunications server 10 and the control application 12 executing thereon manage communications between external devices 22 and components inside the controlled environment 32. These management activities include inspecting, analyzing, validating, securing, monitoring, recording, and encrypting communications between the external devices 22 and the controlled environment 32. The wireless communications devices 34, 46, 48, 50 may also perform these activities.

The wireless communications devices 34, 46, 48, 50 further validate, extract, convert, compress, encrypt, and insert data and meta-data associated with transmissions and transactions of external devices 22 into the controlled environment blockchain ledger. External devices 22 may be designated as trusted devices, illustrated in FIG. 1 as mesh network node application 24 for inclusion into the multipath wireless mesh network.

Configuration data and meta-data for wireless communications devices 34, 46, 48, 50 is added to the blockchain ledger in the form of transactions. Such configuration data and meta-data may comprise inmate information including name and ID, inmate commissary and banking data, SIM identifiers for the devices 34, 46, 48, 50, MAC addresses, and phone numbers. The data and meta-data may also include device identifiers such as IMIE and IP addresses, GPS coordinates, approved contact information, approved applications, approved websites, and validation and biometric information that may include fingerprints, voice prints, and facial recognition data.

Transactions are validated by at least one blockchain node 38a-d, 14, 26, 54 and added to the blockchain ledger. Transactions include data and meta-data associated with voice calls, video conferences, text messages, voice mail messages, GPS coordinates, data, and alerts. Transactions also include data and meta-data associated with accesses and interactions with web pages, multimedia files, forms and applications, shared data such as transaction records, transaction attributes, credentials, communication files, and other items of information.

An external device 22 may initiate a transaction, including a voice or video session, with a wireless communication device 34. Transactions also include the other types of electronic interactions described immediately above. The device 34, upon receipt of the incoming communication, places the session into a hold state, and sends a request for validation via the blockchain and to the telecommunications server 10. The request may be validated via the blockchain and the telecommunications server 10 may request and initiate monitoring as part of the validation if monitoring is desired, but validation by the blockchain may not be the sole source of validation. The request contains identification of parties to the call. The telecommunications server 10 may request and initiate a conference call if real-time monitoring is desired.

Upon receipt of validation, the device 34 removes the call from hold state. The inmate may then begin his/her the voice or video session with the caller using the external device 22. The device 34 may record the call.

The recording of the session is continuously validated via the blockchain network to remain within the multipath wireless mesh network. The continuous validation may ensure than any failure of conference call or data upload is remedied by streaming the audio via the multipath wireless mesh network.

Recording of the call and video session between the external device 22 and the wireless communication device 34 is distributed via at least one of the multipath wireless mesh network, the Wi-Fi network 30, and the cellular network 28 to one or more of the database 18 and the blockchain ledger. As part of the continuous confirmation during the session, meta-data for the recording is added to the blockchain ledger.

Validation may comprise adding a blockchain-based smart contract to the blockchain as discussed in detail below. Use of the smart contract facilitates payment by the inmate for communications services.

Inmates using the device 34, 46, 48, 50 may conversely initiate a transaction, which may include a voice or video session or other transaction as defined above, to an external device 22 that may be in possession of a family member, for example. Similar to calls initiated by the external device 22, the device 34 sends a request for validation via the blockchain and to the telecommunications server 10 advising of the parties to the call. The telecommunications server 10 may initiate a conference call if real time monitoring is desired.

Upon validation, the call from the device 34 in possession of the inmate to the external device 22 is completed. The device 34 records the call as previously.

Recording of the call and video session to the external device 22 initiated by the wireless communication device 34 is distributed via at least one of the multipath wireless mesh network, the Wi-Fi network 30, and the cellular network 28 to one or more of the database 18 and the blockchain ledger. As part of the continuous confirmation during the session, meta-data for the recording is added to the blockchain ledger.

The recording of the session initiated by the device 34 is continuously validated via the blockchain network to remain within the multipath wireless mesh network. As previously, the continuous validation may ensure than any failure of conference call or data upload is remedied by streaming the audio via the multipath wireless mesh network.

A blockchain-based smart contract is filled in with necessary information on the device 34 when the device 34 is involved in an outgoing or incoming call or other transaction as defined herein. Tokens purchased previously may be withdrawn from a blockchain wallet account and/or banking account of the inmate and inserted into the contract.

The smart contract is validated and added to the blockchain network by the network of nodes as part of the validation process. Upon attempting of the voice or video call, the contract is executed depending on the outcome of the call. Outcomes include at least one of call failure, no answer, voicemail received, and call completion. Upon completion of the call, coins or funds are released to at least one of a controlled environment wireless system service provider, the facility of the controlled environment 32, and caller depending on rules described in the contract.

The external device 22 acting as a blockchain wallet or node 26 may request a session with the device 34 of an inmate by generating a blockchain enforced communications request. The request is generated by creating a transaction containing the desired scheduling details. The details comprise at least one name of the requesting party, the name of the inmate to be contacted, the inmate ID, requested date and start time of the call, and contact details of the requesting party.

The desired scheduling details are inserted into the blockchain along with payment tokens. The tokens may be pre-purchased or available in account balances of an external party. The tokens may also be available in an inmate's commissary or other approved banking account of the controlled environment 32.

The processing of the blockchain enforced communications request continues upon validation of the external device 22 as an authorized inmate contact. Validation is completed by at least one of the several components including the device 34 of the inmate, the telecommunication server 10, and the control application 12. Validation takes place prior to passing of the request through to the controlled environment wireless system.

Validation of voice and video calling as well as other transactions as defined herein may include review of other restrictions on an inmate's use of the device 34. The restrictions comprise limitations based on the time of day, day of week, controlled environment restrictions, and other restrictions determined by authorities of the controlled environment.

Continuing with actions associated with a request by the external device 22 for a communications session, upon validation the requested scheduling transaction is added to the blockchain ledger. The request is sent to wireless device 34, 46, 48, 50 that is the intended recipient. Confirmation is sent to the external device 22 of the requesting party.

When a communication between the external device 22 and the device 34 in possession of an inmate is completed according to set parameters, the deposited tokens are released to the controlled environment wireless system service provider. Otherwise the tokens may be released back to the walled that created the communications request.

Information associated with transactions is converted into an internet protocol (IP)-based format to assist in generating formatted information. The blockchain network may be one of a public blockchain, a private blockchain, and a consortium blockchain. Nodes on the blockchain may be one of an administrative node, a mandatory node, and an optional node.

The blockchain network may use at least one of a centralized ledger, a permissioned distributed ledger, and a permissionless ledger. Transactions may be at least one of compressed and encrypted.

System and methods described herein provide for the wireless communication device 34, 46, 48, 50 to record a voice or video session instead of the database 18. Further, the call is validated via the blockchain to allow error correction to insure the call continues. Upon completion, the recording is then stored in one or more of the blockchain and the central database 18 and the meta-data is added to the blockchain.

What is claimed is:

1. A method of providing blockchain wireless services in a controlled environment, comprising:
   a computer receiving a message from a first wireless communication device associated with a first inmate of a controlled environment, the message seeking scheduling of one of a voice and video session with a communication device external to the controlled environment, the computer further comprising a second wireless communication device associated with a second inmate;
   at least one of the computer and the first wireless communication device generating a request for scheduling of the session by creating a transaction containing at least desired scheduling details of the session;
   the computer validating the first wireless communication device and the first inmate as authorized to contact the external communication device;
   the computer recording the validation into the transaction;
   the computer inserting the transaction into a blockchain, the transaction including data and meta-data describing the session;
   the computer, based on the validation, passing the request through to a controlled environment wireless system; and
   the computer creating and inserting a new transaction into the blockchain describing a result of the request, the result comprising at least one of call failure, no answer, voicemail received, and call completion.

2. The method of claim 1, further comprising the first wireless communication device requesting the scheduling by generating a blockchain-enforced communications request.

3. The method of claim 1, further comprising the first wireless communication device acting as one of a blockchain wallet and node.

4. The method of claim 1, wherein the scheduling details comprise at least one of inmate name, inmate ID, requested date, requested start time, and details about the external communication device and associated user.

5. The method of claim 1, wherein payment tokens associated with the requested session are one of pre-purchased and available in at least one of an account balance of a party associated with the external device, a blockchain wallet account, an inmate commissary account, and another approved banking account of the controlled environment.

6. The method of claim 1, wherein the validation comprises review of restrictions imposed on the first wireless communication device of the first inmate comprising restrictions based on time of day, day of week, controlled environment permissions.

7. The method of claim 1, wherein the blockchain is one of operated on an internal basis to a network of the controlled environment and permissioned and operated externally on a public blockchain network and is permissionless.

8. A method for managing commissary transactions in a controlled environment using blockchain and smart contracts, comprising:
    a computer managing storage of pre-bought tokens in an account on behalf of a first holder of a first wireless communications device, the computer further comprising one of the first wireless communications device and a second wireless communications device associated with a second holder;
    the computer receiving an instruction to allocate a first quantity of the tokens to an imminent transaction associated with the first holder;
    the computer creating a smart contract describing the transaction and inserting the contract into a blockchain;
    the computer inserting the first quantity of the tokens into the smart contract upon receipt of advice that the transaction has proceeded,
    the computer releasing the first quantity of tokens to a commissary associated with the controlled environment; and
    the computer propagating at least one blockchain ledger update describing the transaction.

9. The method of claim 8, wherein the first holder of the first wireless communications device is an inmate of the controlled environment, the inmate previously approved to enter into transactions with the commissary.

10. The method of claim 8, wherein first holder of the first wireless communications device is a party external to the controlled environment, the party previously approved to enter into transactions with the commissary.

11. The method of claim 8, wherein one of pickup and delivery of items sold in the transaction is confirmed by at least one entry into the blockchain.

12. The method of claim 11, wherein in the event that one of pickup and delivery does not take place by a certain date and time, the first quantity of tokens are returned to the account.

13. The method of claim 8, wherein the smart contract contains details of the transaction comprising at least one of item(s) purchased, quantities, date and time of pickup delivery, and a timeout date and time of the transaction.

14. The method of claim 8, wherein the first holder is required to provide proof of identity comprising at least one of approved contact information comprising biometric identification comprising at least one of fingerprints, voice prints, and facial recognition data and further comprising quick response (QR) code and password.

15. A system for token management in a controlled environment supported by a blockchain, comprising:
    a first device comprising at least one of a computer and a wireless device in possession of an inmate of a controlled environment;
    a blockchain stored at least in the first device; and
    a token system application stored in the first device that when executed:
        manages storage of pre-bought tokens in accounts of holders of communications devices associated with the controlled environment,
        releases the pre-bought tokens from the accounts in payment for goods and services transactions entered into by the holders, the transactions documented by smart contracts inserted into the blockchain,
        selectively modifies transaction fees as one of incentives to the holders to execute the transactions and generate revenues for the controlled environment, and
        promotes processing and handling of at least one of new tokens and the pre-bought tokens by selected holders to further generate revenues and defray expenses associated at least with operation of the system.

16. The system of claim 15, wherein the blockchain is proprietary to the controlled environment and is permissioned.

17. The system of claim 15, wherein the holders of the devices are one of parties external to the controlled environment and are inmates of the controlled environment, the holders previously approved to enter into transactions with at least one of a commissary function, for voice and video transmission, for controlled access to Internet, for messaging, and for access to approved applications.

18. The system of claim 15, wherein the blockchain is run by the communications devices and further run by node devices controlled by the environment and in possession of officials of the controlled environment.

19. The system of claim 15, wherein the system applies cryptography to operations involving tokens and prohibits devices other than officially controlled devices from accessing information about such operations.

20. The system of claim 15, wherein the blockchain is instead public and permissionless and is operated external to the controlled environment.

21. A method for enforcement of regulations in a controlled environment comprising:
    a computer receiving notification of an adverse blockchain event in a blockchain comprising a verification failure of at least one blockchain transaction, the computer further comprising a wireless communication device associated with an inmate of the controlled environment;
    the computer creating a new blockchain transaction describing the event, visibility of the new transaction limited to selected official devices and other devices at the discretion of holders of the selected official devices;
    the computer entering the new transaction into the blockchain, the entry triggering enforcement of at least one policy of the controlled environment.

22. The method of claim 21, wherein the verification failure is caused by an attempt by at least one of an inmate of the environment and an external party to the environment to at least one of access, interrupt, and modify services of the environment in a non-approved manner.

23. The method of claim 22, wherein at least one policy enforcement results in removal of a device in possession of one of the inmate and the external party involved in perpetration of the event from the blockchain with further validation via the blockchain of the device disabled.

24. The method of claim 21, wherein receipt of notifications of adverse blockchain events enables recordkeeping by the controlled environments of attempts by inmates and external parties to access at least one of unauthorized data and unauthorized services.

25. The method of claim 21, wherein receipt of notifications of adverse blockchain events further enables investigation of potential illegal activities.

26. The method of claim 21, wherein enforcement of the at least one policy results in development of chain of custody for evidence used in court cases.

27. The method of claim 21, further comprising the computer performing tracking and analysis of adverse blockchain events enabling administration of the controlled environment to set alerts for certain suspicious activities.

\* \* \* \* \*